US008438220B2

(12) United States Patent
Kosaraju et al.

(10) Patent No.: US 8,438,220 B2
(45) Date of Patent: May 7, 2013

(54) METHOD FOR OPTIMIZING REMOTE OBJECT IMPLEMENTATIONS

(75) Inventors: Ravi Krishna Kosaraju, Johnston, RI (US); Krishnamohan Dantam, Chelmsford, MA (US); James Hulme Battle, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/827,649

(22) Filed: Jun. 30, 2010

(65) Prior Publication Data

US 2012/0005260 A1 Jan. 5, 2012

(51) Int. Cl.
*G06F 15/16* (2006.01)
(52) U.S. Cl.
USPC .......................... 709/203; 709/213; 370/392
(58) Field of Classification Search .................. 709/203, 709/213; 370/392
See application file for complete search history.

(56) References Cited

U.S. PATENT DOCUMENTS

| 5,682,534 | A | 10/1997 | Kapoor et al. | |
| 6,240,466 | B1 * | 5/2001 | McKeehan et al. | 719/316 |
| 6,718,550 | B1 | 4/2004 | Lim et al. | |
| 7,024,656 | B1 * | 4/2006 | Ahad | 717/116 |
| 7,356,034 | B2 * | 4/2008 | Kobayashi | 370/392 |
| 7,392,256 | B2 * | 6/2008 | Jia et al. | 1/1 |
| 7,631,181 | B2 * | 12/2009 | Hirata et al. | 713/151 |
| 7,716,347 | B2 * | 5/2010 | Chan et al. | 709/228 |
| 7,836,122 | B2 * | 11/2010 | Edwards et al. | 709/203 |
| 7,966,381 | B2 * | 6/2011 | Fusari | 709/213 |
| 7,996,542 | B2 * | 8/2011 | Polozoff | 709/227 |
| 8,151,347 | B2 * | 4/2012 | Beck | 726/21 |
| 2004/0158843 | A1 * | 8/2004 | Cloccarelli | 719/330 |
| 2006/0168169 | A1 * | 7/2006 | Finan et al. | 709/223 |
| 2011/0137974 | A1 * | 6/2011 | Momchilov | 709/202 |

FOREIGN PATENT DOCUMENTS

EP 0973094 A1 1/2000

OTHER PUBLICATIONS

Alt et al., "Adapting Java RMI for Grid Computing," Elsevier, Future Generation Computer Systems 21 (2005), pp. 699-707.
McGachey et al., "Pervasive Load-Time Transformation for Transparently Distributed Java," Electronic Notes in Theoretical Computer Science (ENTCS), v.253, Issue 5, pp. 47-64, Dec. 2009.
Zdun, "Pattern-Based Design of a Service-Oriented Middleware for Remote Object Federations," ACM Transactions on Internet Technology, v.8, n.3, Article 15, May 2008, pp. 1-38.
Lin et al., "Optimizing Java Based Web Services by Partial Evaluation," Paper, Supporting by the National High Technology Development Program of China, Grant No. 2001AA113160, 2001.
Black et al., "Implementing Location Independent Invocation," IEEE Trans. on Parallel and Distributed Systems, v.1, n.1, pp. 107-115, Jan. 1990.

* cited by examiner

*Primary Examiner* — Tesfay Yohannes
(74) *Attorney, Agent, or Firm* — Hamilton & Terrile, LLP; Stephen A. Terrile

(57) ABSTRACT

A method, system and computer-usable medium are disclosed for reducing overhead associated with exporting remote objects. A session context is generated when a remote or local session is respectively established by a remote or local client with a bootstrap remote object. The session context is then determined to be either remote or local and marked accordingly. If the session context is marked as remote, then the bootstrap remote object is exported as remote objects. However, if the session context is marked as local, then the bootstrap remote object is not exported as remote objects. Instead, they are provided for use by the local client as non-exported remote objects.

17 Claims, 3 Drawing Sheets

METHOD FOR OPTIMIZING REMOTE OBJECT IMPLEMENTATIONS

BACKGROUND OF THE INVENTION

1. Field of the Invention

The present invention relates in general to the field of computers and similar technologies, and in particular to software utilized in this field. Still more particularly, it relates to reducing overhead associated with exporting remote objects.

2. Description of the Related Art

In computer science, an Object is typically defined as a compilation of attributes (object elements) and behaviors (methods or subroutines) encapsulating an entity. Accordingly, while primitive or simple data types are single pieces of information, object oriented objects are complicated types that have multiple pieces of information and specific properties (or attributes). As such, they are commonly considered to be fundamental data types in object-oriented programming languages and the foundation of object-oriented programming.

Remote objects are applications that do not reside on the computer executing the application code. These objects are able to be requested by the program using techniques such as a Remote Procedure Call (RPC). For example, the Java Remote Method Invocation (RMI) is a type of access to remote objects that a programmer, using the Java programming language, employs to access objects on different platforms over a distributed network. The Java RMI can facilitate distributed object interaction for Java Objects and provides seamless integration between Java Objects by taking advantage of the Java object model whenever possible.

Certain Java application frameworks create large numbers of fine-grained remote objects and there is an associated performance overhead when these remote objects are created and accessed through their remote references. For example, memory is consumed when storing the object reference in the object table and CPU cycles are consumed for placing remote objects in an object table, performing look-up operations when invoking a method, cleaning up the object table when the remote object is no longer needed, etc. However, the usage of these objects is often by clients in the same virtual machine and typically from the web container layer. As a result, the incurrence of RMI overhead in these cases is unnecessary. In existing solutions, clients in the same virtual machine bypass the RMI layer to avoid serialization overhead, but the overhead of exporting those objects is still incurred.

SUMMARY OF THE INVENTION

A method, system and computer-usable medium are disclosed for reducing overhead associated with exporting remote objects. In various embodiments, a session context is generated when a remote or local session is respectively established by a remote or local client with a bootstrap remote object. The session context is then determined to be either remote or local and is then marked accordingly.

If the session context is marked as a remote context, then the bootstrap remote object is exported as remote objects, which are then remotely referenced to the remote client. However, if the session context is marked as a local context, then the bootstrap remote object is not exported as remote objects. Instead, they are provided for use by the local client as non-exported remote objects, which are then locally referenced to the local client.

In one embodiment, the bootstrap remote object receives parameters from the remote or local client, which are in turn processed to determine the session context. In another embodiment, stack frames associated with an invocation call are processed to determine the session context.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
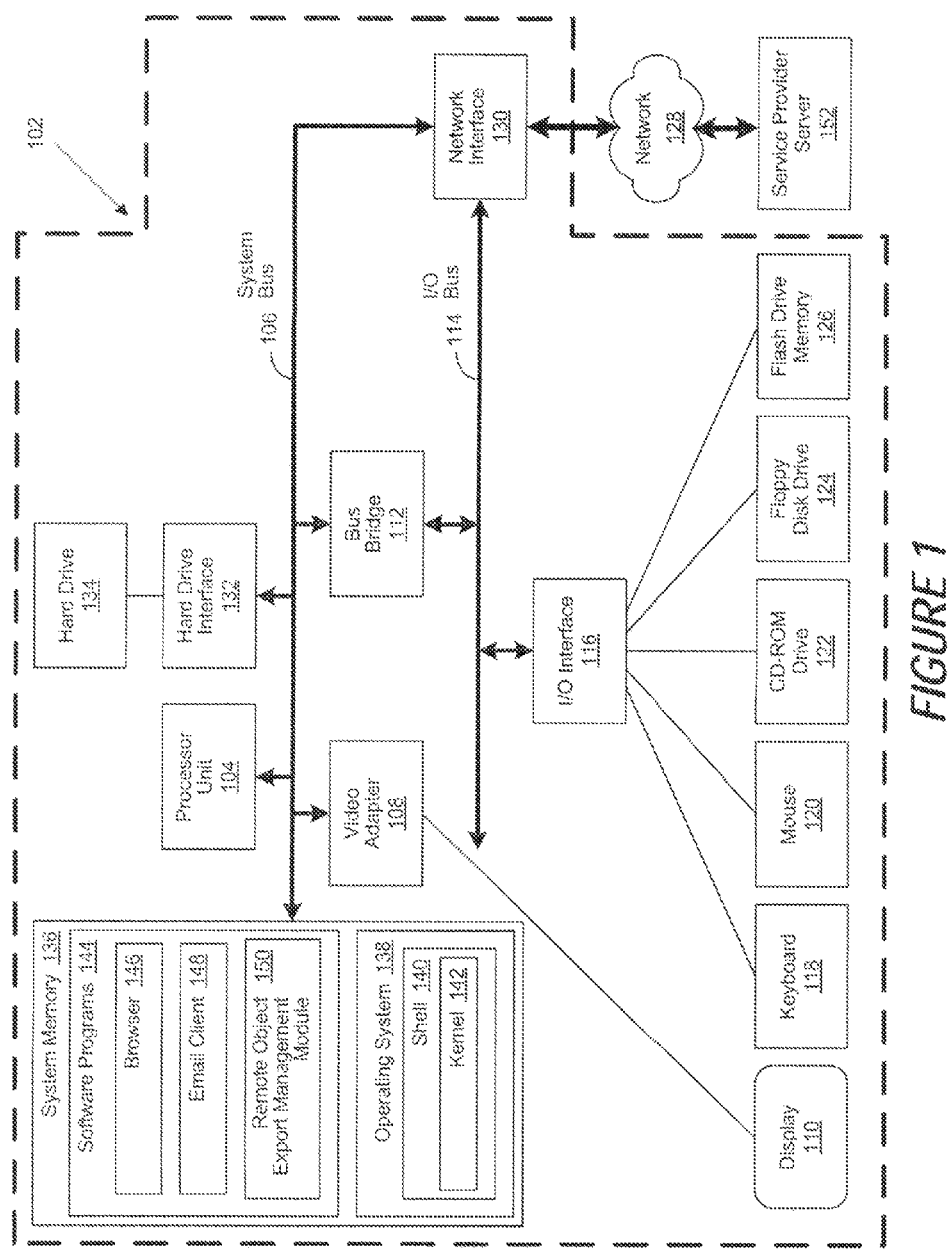
FIG. 1 depicts an exemplary client computer in which the present invention may be implemented.

A method, system and computer-usable medium are disclosed for reducing overhead associated with exporting remote objects. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk—Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a remote object management module 150. The remote object management module 150 includes code for implementing the processes described in FIGS. 2-4 described hereinbelow. In one embodiment, client computer 102 is able to download the remote object management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
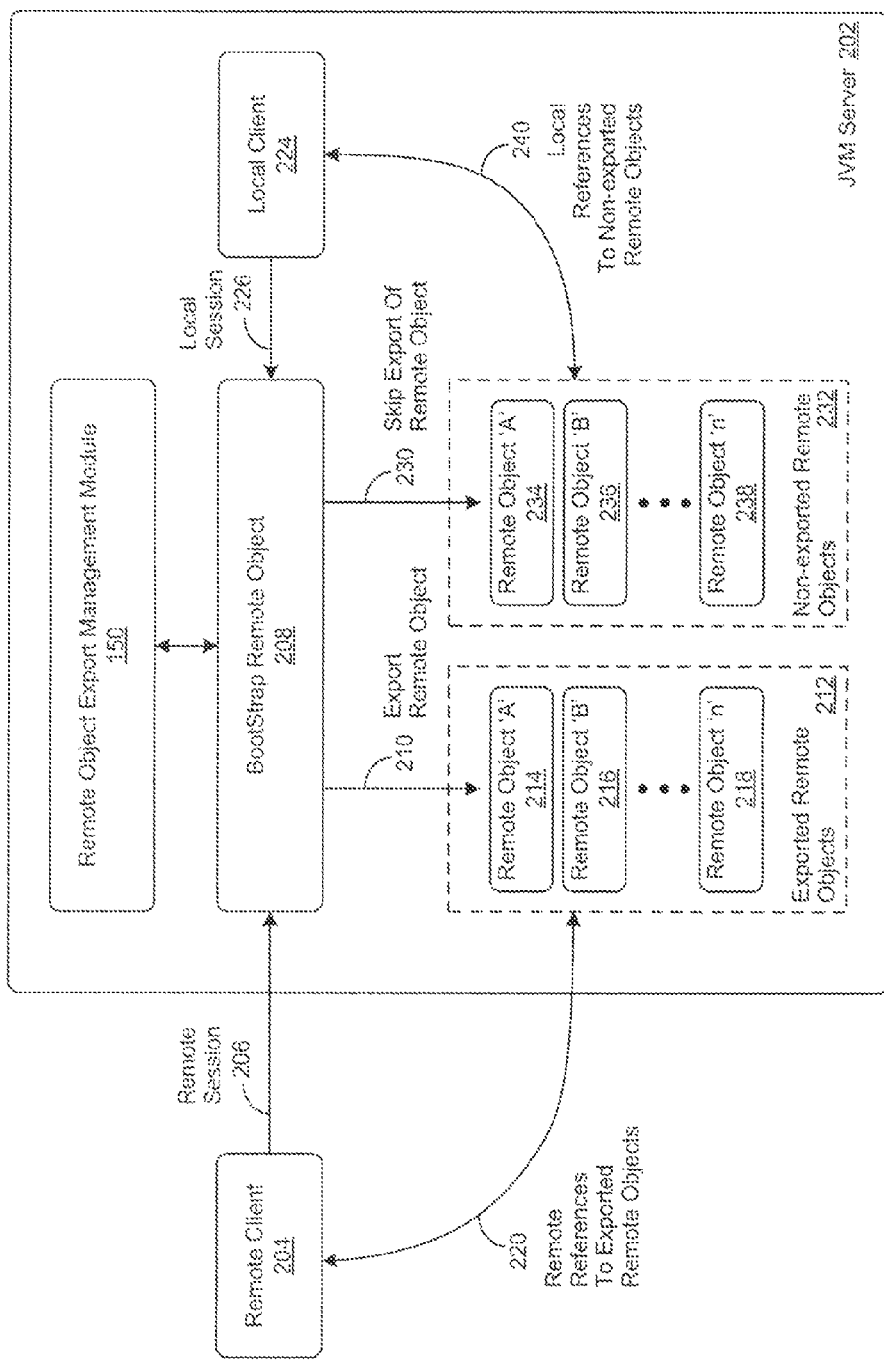
FIG. 2 is a simplified block diagram of the operation of a remote object management module.

FIG. 2 is a simplified block diagram of a remote object management module as implemented in accordance with an embodiment of the invention. In various embodiments, a Java virtual machine (JVM) server 202 comprises a remote object export management module, a bootstrap remote object 208, and a local client 224. In these and other embodiments, a remote client 204 is operable to establish a remote session 206, and the local client 224 is operable to establish a local session 226, with the bootstrap remote object 208. In these various embodiments, the bootstrap remote object 208 is available to the remote client 204 via a naming registry or to a local client 224 via static reference. Skilled practitioners of the art will be familiar with the operation of such bootstrap remote objects 224, which typically are designed to have functions for the creation of remote objects needed by local client 224 or remote client 204. In various embodiments, a session context is generated when a remote session 206, or a local session 226, is respectively established with the bootstrap remote object 208 by the remote client 204 or the local client 206. The remote object export management module 150 then determines whether the session context is a remote context or a local context and the session context is marked accordingly.

If the session context is marked as a remote context, then the remote object export management module 150 exports a remote objects 212, which comprise remote objects 'A' 214, 'B' 216 through 'n' 218. The exported remote objects 212 are then remotely referenced 220 to the remote client 204. However, if the session context is marked as a local context, then the remote object export management module 150 does not export the remote objects 232 which comprise remote objects 'A' 234, 'B' 236 through 'n' 238. The non-exported remote objects 232 are then locally referenced to the local client 234. Those of skill in the art will be aware that the bootstrap remote object 208 typically does not keep any reference to the exported remote objects 212 or the non-exported remote objects 232.

In one embodiment, the bootstrap remote object 208 receives parameters from the remote client 204 or the local client 224, which are in turn processed by the remote object export management module 150 to determine the session context. In another embodiment, the remote object export management module 150 processes the stack frames of an invocation call received by the JVM server 202 to determine the session context.

From the foregoing, it will be apparent to those of skill in the art that CPU cycles, memory usage, and garbage collection overhead are reduced by conditionally exporting, or not exporting, remote objects based on whether the session context is marked as remote or local.

Figure 3:
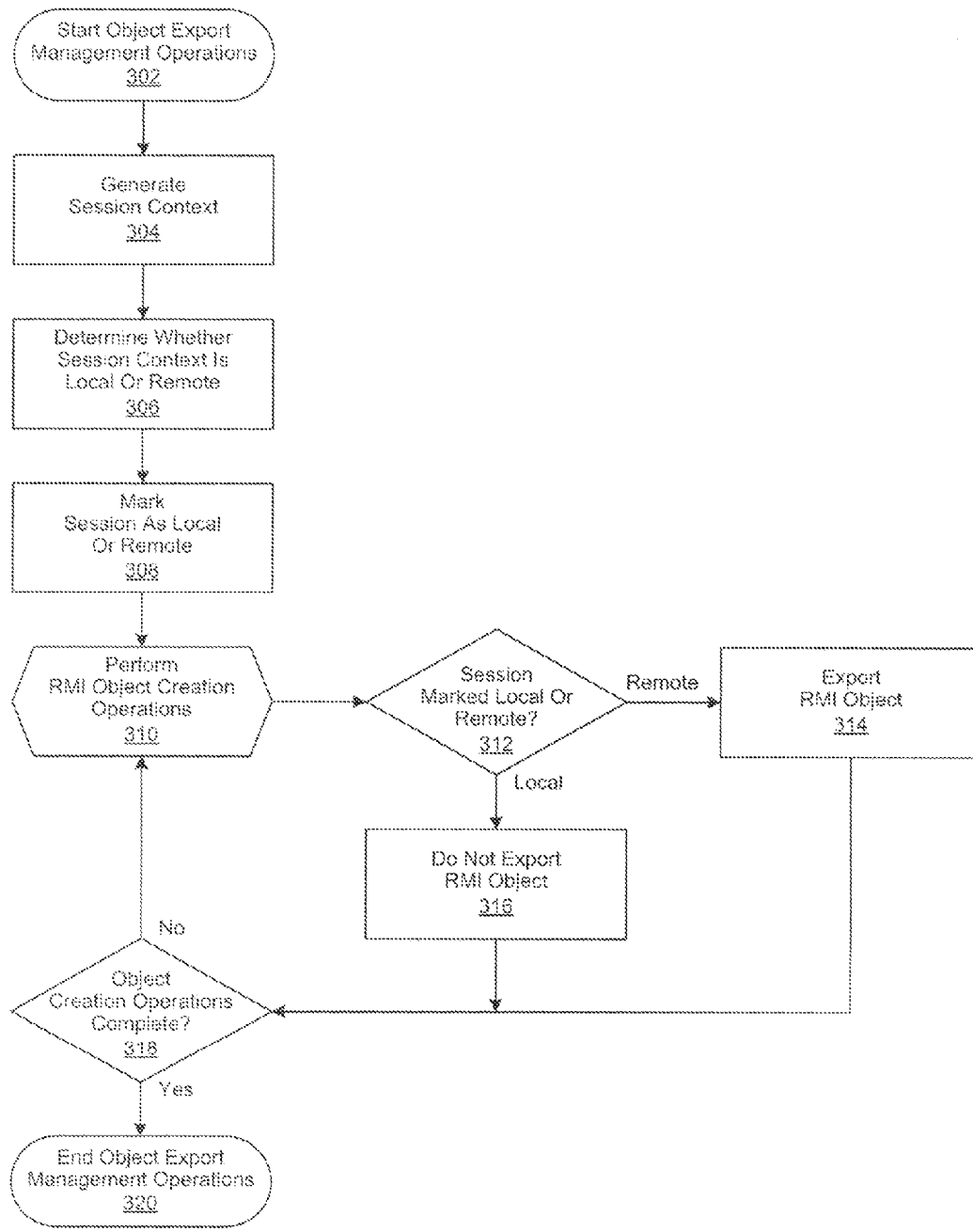
FIG. 3 is a flowchart depicting the operation of a remote object export management module.

FIG. 3 is a flowchart depicting the operation of a remote object export management module as implemented in accordance with one embodiment of the invention for reducing overhead associated with exporting remote objects. In various embodiments, all session-specific Remote Method Invocation (RMI) object implementations are changed to not extend from UnicastRemoteObject prior to starting object export management operations. In this embodiment, object export management operations are begun in step 302, followed by generating the session context in step 304. The session context is then processed in step 306 to determine whether it is a local session or a remote session.

The session is marked accordingly in step 308 and RMI object creation operations are performed in step 310. A determination is then made in step 312 whether the session is marked as a local session or a remote session. If it is determined in step 312 that the session is marked as a remote session, then the RMI object is exported in step 314. Otherwise, the RMI object is not exported in step 316. Once the RMI object is exported in step 314 or not exported in step 316, a determination is made in step 318 whether RMI object creation operations are completed. If not, then the process is continued, proceeding with step 310. Otherwise, object export management operations are ended in step 320.

Although the present invention has been described in detail, it should be understood that various changes, substitutions and alterations can be made hereto without departing from the spirit and scope of the invention as defined by the appended claims.

What is claimed is:

1. A computer-implemented method for reducing overhead associated with exporting remote objects, comprising:
   receiving a request to create a new remote object instantiation;
   generating a session context of the new remote object instantiation;
   determining whether the session context is a remote context or a local context;
   marking the session context as either remote or local;
   conditionally exporting the new remote object if the session context is marked remote; and
   preventing exporting the new remote object if the session context is marked local; and
   wherein a session-specific Remote Method Invocation (RMI) obiect implementation is changed to not extend from Unicast Remote Object prior to receiving the request to create a new remote object instantiation.

2. The method of claim 1, wherein parameters received from a client are processed to determine the session context.

3. The method of claim 2, wherein the client is a remote client.

4. The method of claim 2, wherein the client is a local client.

5. The method of claim 1, wherein stack frames associated with an invocation call are processed to determine the session context.

6. A system comprising:
   a processor; a data bus coupled to the processor; and
   a computer-usable medium embodying computer program code, the computer-usable medium being coupled to the data bus, the computer program code reducing overhead associated with exporting remote objects and comprising instructions executable by the processor and configured for:
   receiving a request to create a new remote object instantiation;
   generating a session context of the new remote object instantiation;
   determining whether the session context is a remote context or a local context;
   marking the session context as either remote or local;
   conditionally exporting the new remote object if the session context is marked remote; and
   preventing exporting the new remote object if the session context is marked local; and
   wherein a session-specific Remote Method Invocation (RMI) obiect implementation is changed to not extend from Unicast Remote Obiect prior to receiving the request to create a new remote obiect instantiation.

7. The system of claim 6, wherein parameters received from a client are processed to determine the session context.

8. The system of claim 7, wherein the client is a remote client.

9. The system of claim 7, wherein the client is a local client.

10. The system of claim 6, wherein stack frames associated with an invocation call are processed to determine the session context.

11. A non-transitory computer-usable medium embodying computer program code, the computer program code comprising computer executable instructions configured for:
    receiving a request to create a new remote object instantiation;
    generating a session context of the new remote object instantiation;
    determining whether the session context is a remote context or a local context;
    marking the session context as either remote or local;
    conditionally exporting the new remote object if the session context is marked remote; and
    preventing exporting the new remote object if the session context is marked local; and
    wherein a session-specific Remote Method Invocation (RMI) obiect implementation is changed to not extend from Unicast Remote Obiect prior to receiving the request to create a new remote obiect instantiation.

12. The computer usable medium of claim 11, wherein parameters received from a client are processed to determine the session context.

13. The computer usable medium of claim 12, wherein the client is a remote client.

14. The computer usable medium of claim 12, wherein the client is a local client.

15. The computer usable medium of claim 11, wherein stack frames associated with an invocation call are processed to determine the session context.

16. The computer usable medium of claim 11, wherein the computer executable instructions are deployable to a client computer from a server at a remote location.

17. The computer usable medium of claim 11, wherein the computer executable instructions are provided by a service provider to a customer on an on-demand basis.

* * * * *